US012655260B2

(12) United States Patent
Yuan et al.

(10) Patent No.: US 12,655,260 B2
(45) Date of Patent: Jun. 16, 2026

(54) POLYETHYLENE FILM FOR HEAT SEALING

(71) Applicant: SABIC GLOBAL TECHNOLOGIES B.V., Bergen op Zoom (NL)

(72) Inventors: Li Yuan, Shanghai (CN); Priya Garg, Vaals (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 296 days.

(21) Appl. No.: 18/269,812

(22) PCT Filed: Nov. 30, 2021

(86) PCT No.: PCT/EP2021/083603
§ 371 (c)(1),
(2) Date: Jun. 27, 2023

(87) PCT Pub. No.: WO2022/144137
PCT Pub. Date: Jul. 7, 2022

(65) Prior Publication Data
US 2024/0067786 A1 Feb. 29, 2024

(30) Foreign Application Priority Data
Dec. 29, 2020 (WO) ................ PCT/CN2020/140626

(51) Int. Cl.
| | |
|---|---|
| B32B 27/06 | (2006.01) |
| B32B 27/32 | (2006.01) |
| B65B 51/10 | (2006.01) |
| C08J 5/18 | (2006.01) |

(52) U.S. Cl.
CPC ................ *C08J 5/18* (2013.01); *B32B 27/06* (2013.01); *B32B 27/32* (2013.01); *B65B 51/10* (2013.01); *B32B 2307/31* (2013.01); *B32B 2307/542* (2013.01); *B32B 2307/7376* (2023.05); *B32B 2553/00* (2013.01); *C08J 2323/08* (2013.01)

(58) Field of Classification Search
CPC .......... B32B 2307/31; B32B 2307/542; B32B 2307/7376; B32B 2553/00; B32B 27/06; B32B 27/32
See application file for complete search history.

(56) References Cited

U.S. PATENT DOCUMENTS

2007/0298508 A1* 12/2007 DesLauriers ...... G01N 21/3563
436/85

FOREIGN PATENT DOCUMENTS

| | | | |
|---|---|---|---|
| JP | 2002017844 A | * | 1/2002 |
| JP | 2012035630 A | * | 2/2012 |
| WO | 2020064349 A1 | | 4/2020 |
| WO | 2020148229 A1 | | 7/2020 |

OTHER PUBLICATIONS

Machine translation of JP-2012035630-A, retrieved Jun. 14, 2025. (Year: 2012).*
Machine translation of JP-2002017844-A, retrieved Jul. 18, 2025. (Year: 2002).*
Sabic, Foam & Light Weight Solutions, Jun. 2021. (Year: 2021).*
International Search Report of the International Searching Authority (ISA/EPO) mailed Mar. 17, 2022 for PCT/EP2021/083603 filed Nov. 30, 2021, 5 pages.
Written Opinion of the International Searching Authority (ISA/EPO) mailed Mar. 17, 2022 for PCT/EP2021/083603 filed Nov. 30, 2021, 4 pages.

* cited by examiner

*Primary Examiner* — Callie E Shosho
*Assistant Examiner* — Krupa Shukla
(74) *Attorney, Agent, or Firm* — CANTOR COLBURN LLP

(57) ABSTRACT
The present invention relates to a film comprising at least one sealing layer wherein at least one layer A of the sealing layer(s) comprises a polyethylene comprising moieties derived from ethylene and moieties derived from an α-olefin comprising 4 to 10 carbon atoms, the polyethylene having a density of $\geq 870$ and $\leq 920$ kg/m$^3$ as determined in accordance with ASTM D792 (2013), wherein the polyethylene has: • a fraction of material that is eluted in analytical temperature rising elution fractionation (a-TREF) at a temperature $\leq 30.0°$ C. of $\leq 14.0$ wt %, preferably $\geq 5.0$ wt % and $\leq 14.0$ wt %, more preferably $\geq 5.0$ wt % and $\leq 12.5$ wt %, with regard to the total weight of the polyethylene; • a shear storage modulus G' determined at a shear loss modulus G"=5000 Pa of <500 Pa. G' and G" being determined in accordance with ISO 6721-10 (2015) at 190° C.; • a melt mass-flow rate, determined at 190° C. under a load of 2.16 kg in accordance with ASTM D1238 (2013) of $\geq 4.00$ and $\leq 8.00$ g/10 min; and • a chemical composition distribution broadness (CCDB) of $\geq 10.0$, preferably $\geq 15.0$. Such film allows for sealing of the film at a reduced temperature, whilst still providing a desirable seal strength, and a desirable hot-tack strength.

20 Claims, No Drawings

POLYETHYLENE FILM FOR HEAT SEALING

CROSS REFERENCE TO RELATED APPLICATIONS

This application is a National Stage application of PCT/EP2021/083603, filed Nov. 30, 2021, which claims the benefit of PCT/CN2020/140626 filed Dec. 29, 2020, both of which are incorporated by reference in their entirety herein.

BACKGROUND

The present invention relates to a polyethylene film for heat sealing, and to multilayer structures comprising such film. The invention also relates to articles comprising such films, and to a process for the production of a sealed article comprising such films.

SUMMARY

Films comprising or consisting of polyethylene materials are abundantly used in a wide variety of applications. A particular example where such polyethylene films find their application is in food packaging. Use of polyethylenes allows for packaging of foodstuff products in a very hygienic manner, contributes to preservation of the packaged products for a prolonged period, and can be done in a very economically attractive way. Further, polyethylene films can be produced with a highly attractive appearance.

DETAILED DESCRIPTION

Polyethylene materials that are suitable for the production of films include low-density polyethylenes, also referred to as LDPE, high-density polyethylenes, also referred to as HDPE, and linear low-density polyethylenes, also referred to as LLDPE. Particularly suitable for many film applications are linear low-density polyethylenes.

Linear low-density polyethylenes may for example be polyethylenes comprising moieties derived from ethylene and moieties derived from an α-olefin comprising 4 to 10 carbon atoms, having a density of $\geq 870$ and $\leq 920$ kg/m³ as determined in accordance ASTM D792 (2013). Preferably, the polyethylene has a density of $\geq 880$ and $\leq 915$ kg/m³, more preferably of $\geq 890$ and $\leq 910$ kg/m³.

The LLDPE may for example have a melt mass-flow rate, determined at 190° C. under a load of 2.16 kg (MFR2), in accordance with ASTM D1238 (2013), of $\geq 4.00$ and $\leq 8.00$ g/10 min, preferably $\geq 4.50$ and $\leq 7.50$ g/10 min, more preferably $\geq 5.00$ and $\leq 7.50$ g/10 min, even more preferably $\geq 5.00$ and $\leq 7.00$ g/10 min. Such LLDPE allows for manufacturing of films with appropriate melt stability and processability.

In the field of application of polyethylene films for packaging, a particular aspect relates to the sealing of such packages.

In commercial use, polyethylene films may for example be used in packaging of products, such as foodstuffs, wherein the package is filled with the desired product and sealed by contacting two layers of film, such as a film obtained by cast film extrusion, and application of heat to at least a portion of the area where the films are contacting each other. The applied heat results in a local softening of the polyethylene material of both the layers that are brought into contact with each other. This leads to adhesion between the two layers, and, upon cooling, to a closed seal, thus forming a package that contains the desired contents separated from the surrounding atmosphere.

Such packages are well known in everyday applications, and allow for example a significant increase in retention of the contained products.

In such packaging solutions, the seals that are produced using such heat-sealing technology as described above need to have a certain strength. This is required in order to be able to produce a package that, during production, transport and consumer use, is able to withstand certain forces it should be considered able to withstand. Therefore, the strength of the seal should be above a certain threshold.

What is further important, in view of the process efficiency of the packaging process as well as the energy consumption during the packaging process, is that such seal having a desirably high strength may be produced at a sealing temperature that is desirably low. The lower the temperature at which the seal is formed, the less energy is to be employed. A further benefit of a lower temperature that is required for seal formation is that the contents of the package are to a lesser degree subjected to certain elevated temperatures, which, for example in the case of packaging of foodstuffs, may be beneficial for the retention of the quality of the packaged contents.

A further important property in such packaging solutions based on polyethylene materials is the so-called hot tack strength. In the context of the present invention, the hot tack strength is to be understood as the strength of a seal made in a film of the polyethylene by heat-sealing immediately after the sealing, before the seal has cooled down. The hot tack strength affects the efficiency of the packaging process in which the polyethylene film material is employed, for example the speed at which the packaging lines may be operated. The higher the hot tack strength, the less cooling time is required upon seal formation prior to further processing of the package, i.e. the earlier the strength of the seal is of such magnitude as to be able to withstand exerted forces without damaging the seal, the shorter the cycle time in for example continuous packaging machines.

For these reasons, there is an ongoing desire in the packaging industry to have access to polyethylene films that demonstrate a reduction of the temperature at which a seal of certain defined strength can be produced, where the hot-tack strength of that seal is particularly high.

Such films are now provided according to the present invention by a film comprising at least one sealing layer wherein at least one layer A of the sealing layer(s) comprises a polyethylene comprising moieties derived from ethylene and moieties derived from an α-olefin comprising 4 to 10 carbon atoms, the polyethylene having a density of $\geq 870$ and $\leq 920$ kg/m³ as determined in accordance with ASTM D792 (2013), wherein the polyethylene has:

a fraction of material that is eluted in analytical temperature rising elution fractionation (a-TREF) at a temperature $\leq 30.0°$ C. of $\leq 14.0$ wt %, preferably $\geq 5.0$ wt % and $\leq 14.0$ wt %, more preferably $\geq 5.0$ wt % and $\leq 12.5$ wt %, with regard to the total weight of the polyethylene;

a shear storage modulus G' determined at a shear loss modulus G"=5000 Pa of <500 Pa, G' and G" being determined in accordance with ISO 6721-10 (2015) at 190° C.;

a melt mass-flow rate, determined at 190° C. under a load of 2.16 kg in accordance with ASTM D1238 (2013) of $\geq 4.00$ and $\leq 8.00$ g/10 min; and a chemical composition distribution broadness (CCDB) of ≥10.0, preferably ≥15.0, wherein the CCDB is determined according to formula I:

$$CCDB = \frac{T_{z+2} - T_{n-2}}{T_{n-2}} * 100 \qquad \text{formula I}$$

wherein $T_{n-2}$ is the moment calculated according to the formula II:

$$T_{n-2} = \frac{\sum \frac{w(i)}{T(i)^2}}{\sum \frac{w(i)}{T(i)^3}} \qquad \text{formula II}$$

and $T_{z+2}$ is the moment calculated according to the formula III:

$$T_{z+2} = \frac{\sum w(i) \cdot T(i)^4}{\sum w(i) \cdot T(i)^3} \qquad \text{formula III}$$

wherein w(i) is the sampled weight fraction in wt % with regard to the total sample weight in a-TREF analysis of a sample (i) taken at temperature T(i), where T(i)>30° C., the area under the a-TREF curve being normalised to surface area=1 for T(i)>30° C.; and T(i) is the temperature at which sample (i) is taken in a-TREF analysis, in ° C.

Such film allows for sealing of the film at a reduced temperature, whilst still providing a desirable seal strength, and a desirable hot-tack strength.

The polyethylene that is employed in the layer A of the film according to the present invention has a density of ≥870 and ≤920 kg/m³, preferably of ≥880 and ≤915 kg/m³, more preferably of ≥890 and ≤910 kg/m³, even more preferably of ≥895 and ≤905 kg/m³. The use of a polyethylene having such density in the layer A of the film according to the invention contributes to improved sealing.

The polyethylene preferably has a primary structure parameter 1 (PSP1) of ≥17.0, preferably ≥18.0, more preferably ≥19.0, wherein the PSP1 is determined according to formula IV:

$$PSP1 = \frac{1}{100,000} * \frac{\sum_{i=1}^{n} \left(M_i * \left(\frac{dW_i}{d\text{Log}M_i}\right) * SCB_i\right)}{\sum_{i=1}^{n} \left(\frac{dW_i}{d\text{Log}M_i}\right)} \qquad \text{formula IV}$$

wherein $M_i$ is the molecular weight of a fraction i as determined via SEC-IR analysis;

$W_i$ is the weight fraction having the molecular weight $M_i$; and $SCB_i$ is the number of short chain branches per 1000 carbon atoms in the fraction having the molecular weight $M_i$.

The polyethylene that is employed in the layer A of the film according to the present invention preferably has a fraction of material that is eluted in a-TREF at a temperature ≥30.0° C. and ≤90.0° C. of ≥86.0 wt % and ≤90.0 wt %, with regard to the total weight of the polyethylene. The polyethylene that is employed in the layer A of the film according to the present invention preferably has a fraction of material that is eluted in a-TREF at a temperature ≥90.0° C. of ≥0.5 wt % and ≤1.0 wt %, with regard to the total weight of the polyethylene. The use of such polyethylene in the layer A of the film according to the invention contributes to a reduction of the seal initiation temperature.

The polyethylene that is employed in the layer A of the film according to the present invention has a shear storage modulus G' determined at a shear loss modulus G"=5000 Pa of ≤500 Pa, preferably ≥300 and ≤500 Pa, more preferably ≥400 Pa and ≤500 Pa. The use of a polyethylene having such shear storage modulus G' at a shear loss modulus of 5000 Pa in the layer A of the film according to the invention contributes to improved processability of the film.

According to the invention, analytical temperature rising elution fractionation, also referred to as a-TREF, may be carried out using a Polymer Char Crystaf-TREF 300 equipped with stainless steel columns having a length of 15 cm and an internal diameter of 7.8 mm, with a solution containing 4 mg/ml of sample prepared in 1,2-dichlorobenzene stabilised with 1 g/l Topanol CA (1,1,3-tri(3-tert-butyl-4-hydroxy-6-methylphenyl)butane) and 1 g/l Irgafos 168 (tri(2,4-di-tert-butylphenyl)phosphite) at a temperature of 150° C. for 1 hour. The solution may be further stabilised for 45 minutes at 95° C. under continuous stirring at 200 rpm before analyses. For analyses, the solution was crystallised from 95° C. to 30° C. using a cooling rate of 0.1° C./min. Elution may be performed with a heating rate of 1° C./min from 30° C. to 140° C. The set-up may be cleaned at 150° C. The sample injection volume may be 300 µl, and the pump flow rate during elution 0.5 ml/min. The volume between the column and the detector may be 313 µl. The fraction that is eluted at a temperature of ≤30.0° C. may in the context of the present invention be calculated by subtracting the sum of the fraction eluted >30.0° C. from 100%, thus the total of the fraction eluted ≤30.0° C., and the fraction eluted >30.0° C. to add up to 100.0 wt %.

Particularly, a-TREF may be carried out using a Polymer Char Crystaf-TREF 300 using a solution containing 4 mg/ml of the polymer in 1,2-dichlorobenzene, wherein the solution is stabilised with 1 g/l 1,1,3-tri(3-tert-butyl-4-hydroxy-6-methylphenyl)butane and 1 g/l tri(2,4-di-tert-butylphenyl) phosphite) at a temperature of 150° C. for 1 hour, and further stabilised for 45 minutes at 95° C. under continuous stirring at 200 rpm, wherein the prior to analyses the solution is crystallised from 95° C. to 30° C. using a cooling rate of 0.1° C./min, and elution is performed at a heating rate of 1° C./min from 30° C. to 140° C., and wherein the equipment has been cleaned at 150° C.

For determination of the shear storage modulus G' and the shear loss modulus G", specimens may be used as prepared in accordance with ISO 17855-2 (2016). The DMS measurements were carried out according to ISO 6721-10 (2015) at 190° C. Determination of G' at G"=5000 Pa may be done by preparation of a double-logarithmic Cole-Cole plot of G' and G", where above and below G"=5000 Pa, each 2 data points are to be selected, so in total 4 data points, and a first order line may be determined, where from this line G' at G"=5000 Pa is determined.

The polyethylene that is employed in the layer A of the film according to the present invention has a CCDB of ≥10.0, preferably ≥15.0, more preferably ≥16.0. For example, the polyethylene has a CCDB of ≥15.0 and ≤30.0, preferably ≥16.0 and ≤25.0, more preferably >16.0 and ≤20.0. The use of a polyethylene having such CCDB in the layer A of the film according to the invention contributes to an improved seal strength.

The polyethylene that is employed in the layer A of the film according to the present invention has a melt mass-flow rate, determined at 190° C. under a load of 2.16 kg (MFR2), in accordance with ASTM D1238 (2013), of ≥4.00 and ≤8.00 g/10 min, preferably ≥4.50 and ≤7.50 g/10 min, more preferably ≥5.00 and ≤7.50 g/10 min, even more preferably ≥5.00 and ≤7.00 g/10 min. Such polyethylene allows for manufacturing of films with appropriate melt stability and processability.

It is preferred that the polyethylene comprises ≥70.0 wt % of moieties derived from ethylene, with regard to the total weight of the polyethylene, preferably ≥75.0 wt %, more preferably ≥80.0 wt %. Preferably, the polyethylene comprises ≥70.0 and ≤98.0 wt %, more preferably ≥75.0 and ≤95.0 wt %, even more preferably ≥80.0 and ≤90.0 wt % of moieties derived from ethylene, with regard to the total weight of the polyethylene.

It is further preferred that the polyethylene comprises ≤30.0 wt % of moieties derived from an α-olefin comprising 4-10 carbon atoms, with regard to the total weight of the polyethylene, preferably ≤25.0 wt %, more preferably ≤20.0 wt %. The polyethylene may for example comprise ≥5.0 wt % of moieties derived from an α-olefin comprising 4-10 carbon atoms, with regard to the total weight of the polyethylene, preferably ≥10.0 wt %, more preferably ≥15.0 wt %. For example, the polyethylene may comprise ≥5.0 and ≤30.0 wt % of moieties derived from an α-olefin comprising 4-10 carbon atoms, with regard to the total weight of the polyethylene, preferably ≥10.0 wt % and ≤25.0 wt %, more preferably ≥15.0 and ≤20.0 wt %.

The α-olefin may comprising 4-10 carbon atoms for example be selected from 1-butene, 1-hexene, 4-methyl-1-pentene, and 1-octene, such as from 1-butene, 1-hexene and 1-octene. For example, the α-olefin comprising 4-10 carbon atoms may be selected from 1-hexene and 1-octene. The moieties derived from an α-olefin comprising 4-10 carbon atoms may for example be moieties derived from 1-butene, 1-hexene, 4-methyl-1-pentene, 1-octene, or combinations thereof, preferably from 1-hexene or 1-octene.

The polyethylene that is employed in the layer A of the film according to the present invention may for example comprise ≤30.0 wt % of moieties derived from an α-olefin comprising 4-10 carbon atoms, with regard to the total weight of the polyethylene, preferably ≤25.0 wt %, more preferably ≤20.0 wt %, wherein the α-olefin comprising 4-10 carbon atoms is selected from 1-butene, 1-hexene, 4-methyl-1-pentene, and 1-octene, such as from 1-butene, 1-hexene and 1-octene. The polyethylene may for example comprise ≥5.0 wt % of moieties derived from an α-olefin comprising 4-10 carbon atoms, with regard to the total weight of the polyethylene, preferably ≥10.0 wt %, more preferably ≥15.0 wt %, wherein the α-olefin comprising 4-10 carbon atoms is selected from 1-butene, 1-hexene, 4-methyl-1-pentene, and 1-octene, such as from 1-butene, 1-hexene and 1-octene. For example, the polyethylene may comprise ≥5.0 and ≤30.0 wt % of moieties derived from an α-olefin comprising 4-10 carbon atoms, with regard to the total weight of the polyethylene, preferably ≥10.0 wt % and ≤25.0 wt %, more preferably ≥15.0 and ≤20.0 wt %, wherein the α-olefin comprising 4-10 carbon atoms is selected from 1-butene, 1-hexene, 4-methyl-1-pentene, and 1-octene, such as from 1-butene, 1-hexene and 1-octene.

The layer A of the film according to the present invention may for example comprise >10.0 wt %, or >20.0 wt %, or >30.0 wt %, or >40.0 wt %, or >50.0 wt %, or >60.0 wt %, or >70.0 wt %, or >80.0 wt %, or >90.0 wt %, of the polyethylene, with regard to the total weight of the film. Alternatively, the film consists of or essentially consists of the polyethylene.

In the context of the present invention, the embodiment wherein the layer A of the film essentially consists of the polyethylene is to be understood as wherein the layer A of the film consists of the polyethylene and additives known in the art of polyethylene films, such as up to 1.0 wt % of additives, with regard to the total weight of the film. Suitable additives may for example include UV stabilisers, antioxidants, and processing aids.

The layer A of the film according to the present invention may for example comprise <90.0 wt %, or <80.0 wt %, or <70.0 wt %, or <60.0 wt %, or <50.0 wt %, or <40.0 wt %, or <30.0 wt %, or <20.0 wt %, of the polyethylene, with regard to the total weight of the film. The layer A of the film may comprise for example >20.0 and <50.0 wt % of the polyethylene, or >40.0 wt % and <70.0 wt %, or >60.0 wt % and <90.0 wt %, or >70.0 and <90.0 wt %.

The layer A may for example have a thickness of 1-100 µm, preferably 5-75 µm, more preferably 10-50 µm, more preferably 20-40 µm.

In one of its embodiments, the film consists of the layer A.

The polyethylene may for example be produced via a solution polymerisation process, preferably by polymerisation of ethylene with 1-hexene and/or 1-octene. The polyethylene may for example be produced using a metallocene-type catalyst, preferably by polymerisation of ethylene with 1-hexene and/or 1-octene.

In certain of its embodiments, the present invention also relates to certain multilayer film structures comprising a film according to the present invention. For example, the invention also relates to a multilayer film structure comprising a film according to the present invention, wherein the film is positioned such in the arrangement of the multilayer film structure that at least one of the outer surfaces of the multilayer film structure is constituted by a layer A. Alternatively, the invention also relates to a multilayer film structure comprising a film according to the present invention, wherein the film is positioned such in the arrangement of the multilayer film structure that both the outer surfaces of the multilayer film structure are constituted by a layer A.

In a further embodiment, the invention relates to a multilayer film structure comprising two outer layers and at least one inner layer positioned between the two outer layers, wherein one of the outer layers is constituted by a layer A, or wherein both outer layers are each constituted by a layer A.

The multilayer film structure may for example comprises 3-15 layers, preferably 3-11 layers, more preferably 3-7 layers. The multilayer film structure may for example comprise 3 layers, or 5 layers, or 7 layers.

The multilayer film structure may for example have a thickness of 2-150 µm, preferably 20-100 µm, more preferably 25-75 µm.

In a particular embodiment, the invention also relates to a process for preparing an article comprising a sealed film, the process comprising the steps in this order of:

providing a film or a multilayer film structure according to the invention;

providing an object comprising a surface for sealing with the film or the multilayer film structure;

arranging the film or multilayer film structure and the object so that a layer A of the film or the multilayer film structure and the surface for sealing of the object can be brought into contact with each other;

contacting the film and the surface for sealing at a temperature of ≥60 and ≤80° C., during a time of 1-5 seconds, under application of a pressure of ≥0.3 N/mm² to obtain a heat-sealed article.

The invention also relates to an article comprising a film sealed to a surface, wherein the article comprises a film or a multilayer film structure according to the invention, or wherein the article is produced according to the process according to the invention. For example, such article may be a package for containing foodstuffs, or a package containing foodstuffs.

The invention further also relates to the use of a film according to the invention, or a multilayer film structure according to the invention, for reduction of the sealing temperature of a package.

The invention will now be illustrated by the following non-limiting examples.

In the experiments conducted in the course of the present invention, the following polyethylene materials were used.

| | |
|---|---|
| PE1 | Cohere 8600X, an ethylene-octene copolymer comprising 19.6 wt % 1-octene, obtainable from SABIC |
| PE2 | Affinity PL1281G1, an ethylene-octene copolymer comprising 20.1 wt % 1-octene, obtainable from Dow Chemical |

These materials were analysed to demonstrate the following product properties:

| | PE1 | PE2 |
|---|---|---|
| MFR2 (g/10 min) | 6.0 | 6.0 |
| Density (kg/m³) | 900 | 900 |
| G' at G" = 5000 Pa (Pa) | 490 | 524 |
| Fraction a-TREF <30° C. (wt %) | 10.7 | 14.0 |
| CCDB (—) | 16.5 | 15.3 |
| PSP1 | 19.34 | 16.10 |

Using these materials, films were produced via cast film extrusion, using a single-screw extruder having a screw diameter of 40 mm. Films were produced at a die temperature of 220° C. The films had a thickness of 40 μm and width of 350 mm.

The films produced as per the above process using each of PE 1 through 2 were subjected to analysis and testing, as described below.

| Film | F1 | F2 |
|---|---|---|
| Polyethylene type | PE1 | PE2 |
| SIT for hot-tack at 0.4N (° C.) | 78.6 | 82.5 |
| Hot-tack strength @75° C. | 0.24 | 0.16 |
| Hot-tack strength @80° C. | 0.46 | 0.27 |
| Hot-tack strength @85° C. | 0.59 | 0.52 |
| SIT for heat seal at 0.4N (° C.) | 86.8 | 93.2 |
| Seal strength @86° C. | 335 | 30 |
| Seal strength @90° C. | 576 | 89 |
| Seal strength @94° C. | 787 | 551 |

Wherein:

The hot-tack strength at given temperature is the hot-tack strength as determined in accordance with ASTM F1921 (2012) on a seal produced at the given temperature of 75, 80 and 85° C., respectively, expressed in N/cm, on a seal of 25 mm width.

The seal strength at given temperature is determined in accordance with ASTM F88 (2015) on a seal produced at the given temperature of 86, 90 and 94° C., respectively, expressed in g, on a seal of 25 mm width.

The SIT (seal initiation temperature) for hot-tack at 0.4 N is the temperature in ° C. at which a hot-tack strength of 0.4 N is achieved, wherein the hot-tack strength is determined as above.

The SIT for heat seal at 0.4 N is the temperature in ° C. at which a seal strength of 0.4 N is achieved, wherein the seal strength is determined as above.

From the above results, it can be observed that the film of the present invention, reflected by F1, allows for the production of a seal by heat-sealing having a certain strength at a particularly low sealing temperature.

The invention claimed is:

1. A film comprising at least one sealing layer wherein at least one layer A of the sealing layer(s) comprises a polyethylene comprising moieties derived from ethylene and moieties derived from an α-olefin comprising 4 to 10 carbon atoms, the polyethylene having a density of ≥870 and ≤920 kg/m³ as determined in accordance with ASTM D792 (2013), wherein the polyethylene has:

a fraction of material that is eluted in analytical temperature rising elution fractionation (a-TREF) at a temperature ≤30.0° C. of ≤14.0 wt %, with regard to the total weight of the polyethylene;

a shear storage modulus G' determined at a shear loss modulus G"=5000 Pa of <500 Pa, G' and G" being determined in accordance with ISO 6721-10 (2015) at 190° C.;

a melt mass-flow rate, determined at 190° C. under a load of 2.16 kg in accordance with ASTM D1238 (2013) of ≥4.50 and ≤8.00 g/10 min; and a chemical composition distribution broadness (CCDB) of ≥10.0, wherein the CCDB is determined according to formula I:

$$CCDB = \frac{T_{z+2} - T_{n-2}}{T_{n-2}} * 100 \qquad \text{formula I}$$

wherein $T_{n-2}$ is the moment calculated according to the formula II:

$$T_{n-2} = \frac{\sum_i \frac{w(i)}{T(i)^2}}{\sum_i \frac{w(i)}{T(i)^3}} \qquad \text{formula II}$$

and $T_{z+2}$ is the moment calculated according to the formula III:

$$T_{z+2} = \frac{\sum w(i) \cdot T(i)^4}{\sum w(i) \cdot T(i)^3} \qquad \text{formula III}$$

wherein w(i) is the sampled weight fraction in wt % with regard to the total sample weight in a-TREF analysis of a sample (i) taken at temperature T(i), where T(i)>30° C., the area under the a-TREF curve being normalised to surface area=1 for T(i)>30° C.; and T(i) is the temperature at which sample (i) is taken in a-TREF analysis, in ° C.

2. The film according to claim 1, wherein the polyethylene has a primary structure parameter 1 (PSP1) of ≥17.0, wherein the PSP1 is determined according to formula IV:

$$PSP1 = \frac{1}{100,000} * \frac{\sum_{i=1}^{n}\left(M_i * \left(\frac{dW_i}{d\mathrm{Log}M_i}\right) * SCB_i\right)}{\sum_{i=1}^{n}\left(\frac{dW_i}{d\mathrm{Log}M_i}\right)} \qquad \text{formula IV}$$

wherein:

$M_i$ is the molecular weight of a fraction i as determined via SEC-IR analysis;

$W_i$ is the weight fraction having the molecular weight $M_i$; and $SCB_i$ is the number of short chain branches per 1000 carbon atoms in the fraction having the molecular weight $M_i$.

3. The film according to claim 1, wherein the polyethylene has:

a fraction of material that is eluted in analytical temperature rising elution fractionation (a-TREF) at a temperature ≥30.0° C. and ≤90.0° C. of ≥86.0 wt % and ≤90.0 wt %, with regard to the total weight of the polyethylene; and/or a fraction of material that is eluted in analytical temperature rising elution fractionation (a-TREF) at a temperature ≥90.0° C. of ≥0.5 wt % and ≤1.0 wt %, with regard to the total weight of the polyethylene.

4. The film according to claim 1, wherein the polyethylene comprises ≥70.0 wt % of moieties derived from ethylene, with regard to the total weight of the polyethylene.

5. The film according to claim 1, wherein the polyethylene comprises ≤30.0 wt % of moieties derived from an α-olefin comprising 4 to 10 carbon atoms, with regard to the total weight of the polyethylene.

6. The film according to claim 1, wherein the layer A comprises >50.0 wt % of the polyethylene, with regard to the total weight of the layer A.

7. The film according to claim 1, wherein the polyethylene is produced via a solution polymerisation process, and/or wherein the polyethylene is produced using a metallocene catalyst.

8. The film according to claim 1, wherein the layer A has a thickness of 1-100 μm.

9. The film according to claim 1, wherein the film consists of the layer A.

10. The film according to claim 1, wherein the melt mass-flow rate of the polyethylene is >4.50 and <7.50 g/10 min, determined at 190° C. under a load of 2.16 kg in accordance with ASTM D1238 (2013).

11. The film according to claim 1, wherein the melt mass-flow rate of the polyethylene is >5.00 and <8.00 g/10 min, determined at 190° C. under a load of 2.16 kg in accordance with ASTM D1238 (2013).

12. The film according to claim 1, wherein the melt mass-flow rate of the polyethylene is >5.00 and <7.50 g/10 min, determined at 190° C. under a load of 2.16 kg in accordance with ASTM D1238 (2013).

13. A multilayer film structure comprising the film according to claim 1, wherein the film is positioned such in the arrangement of the multilayer film structure that at least one of the outer surfaces of the multilayer film structure is constituted by the layer A.

14. The multilayer film structure according to claim 13 comprising two outer layers and at least one inner layer positioned between the two outer layers, wherein one of the outer layers is constituted by the layer A or wherein both outer layers are each constituted by the layer A.

15. The multilayer film structure according to claim 13, wherein the multilayer film structure has a thickness of 2-150 μm.

16. A process for preparing an article comprising a sealed film, the process comprising the steps in this order of:

providing the film according to claim 1 or a multilayer film structure comprising the film;

providing an object comprising a surface for sealing with the film or the multilayer film structure;

arranging the film or the multilayer film structure and the object so that the layer A of the film or the multilayer film structure and the surface for sealing of the object can be brought into contact with each other;

contacting the film or the multilayer film structure and the surface for sealing at a temperature of ≥60 and ≤80° C., during a time of 1-5 seconds, under application of a pressure of ≥0.3 N/mm² to obtain a heat-sealed article.

17. An article comprising a film sealed to a surface, wherein the article comprises the film according to claim 1.

18. A film comprising at least one sealing layer wherein at least one layer A of the sealing layer(s) comprises a polyethylene comprising moieties derived from ethylene and moieties derived from an α-olefin comprising 4 to 10 carbon atoms, the polyethylene having a density of ≥870 and ≤920 kg/m³ as determined in accordance with ASTM D792 (2013), wherein the polyethylene has:

a fraction of material that is eluted in analytical temperature rising elution fractionation (a-TREF) at a temperature ≤30.0° C. of ≤14.0 wt %, with regard to the total weight of the polyethylene;

a shear storage modulus G' determined at a shear loss modulus G"=5000 Pa of <500 Pa, G' and G" being determined in accordance with ISO 6721-10 (2015) at 190° C.;

a melt mass-flow rate, determined at 190° C. under a load of 2.16 kg in accordance with ASTM D1238 (2013) of ≥4.00 and ≤8.00 g/10 min; and a chemical composition distribution broadness (CCDB) of >16.0 and <25.0, wherein the CCDB is determined according to formula I:

$$CCDB = \frac{T_{z+2} - T_{n-2}}{T_{n-2}} * 100 \qquad \text{formula I}$$

wherein $T_{n-2}$ is the moment calculated according to the formula II:

$$T_{n-2} = \frac{\sum_i \frac{w(i)}{T(i)^2}}{\sum_i \frac{w(i)}{T(i)^3}} \qquad \text{formula II}$$

and $T_{z+2}$ is the moment calculated according to the formula III:

$$T_{z+2} = \frac{\sum w(i) \cdot T(i)^4}{\sum w(i) \cdot T(i)^3} \qquad \text{formula III}$$

wherein

> w(i) is the sampled weight fraction in wt % with regard to the total sample weight in a-TREF analysis of a sample (i) taken at temperature T(i), where T(i)>30° C., the area under the a-TREF curve being normalised to surface area=1 for T(i)>30° C.; and
>
> T(i) is the temperature at which sample (i) is taken in a-TREF analysis, in ° C.

19. The film according to claim 18, wherein the CCDB of the polyethylene is >16.0 and <20.0.

20. A film comprising at least one sealing layer wherein at least one layer A of the sealing layer(s) comprises a polyethylene comprising moieties derived from ethylene and moieties derived from 1-octene, the polyethylene having a density of ≥870 and ≤920 kg/m³ as determined in accordance with ASTM D792 (2013), wherein the polyethylene has:

> a fraction of material that is eluted in analytical temperature rising elution fractionation (a-TREF) at a temperature ≤30.0° C. of ≤14.0 wt %, with regard to the total weight of the polyethylene;
>
> a shear storage modulus G' determined at a shear loss modulus G"=5000 Pa of <500 Pa, G' and G" being determined in accordance with ISO 6721-10 (2015) at 190° C.;
>
> a melt mass-flow rate, determined at 190° C. under a load of 2.16 kg in accordance with ASTM D1238 (2013) of ≥4.00 and ≤8.00 g/10 min; and
>
> a chemical composition distribution broadness (CCDB) of ≥10.0, wherein the CCDB is determined according to formula I:

$$CCDB = \frac{T_{z+2} - T_{n-2}}{T_{n-2}} * 100 \qquad \text{formula I}$$

wherein

> $T_{n-2}$ is the moment calculated according to the formula II:

$$T_{n-2} = \frac{\sum \dfrac{w(i)}{T(i)^2}}{\sum \dfrac{w(i)}{T(i)^3}} \qquad \text{formula II}$$

and

> $T_{z+2}$ is the moment calculated according to the formula III:

$$T_{z+2} = \frac{\sum w(i) \cdot T(i)^4}{\sum w(i) \cdot T(i)^3} \qquad \text{formula III}$$

wherein

> w(i) is the sampled weight fraction in wt % with regard to the total sample weight in a-TREF analysis of a sample (i) taken at temperature T(i), where T(i)>30° C., the area under the a-TREF curve being normalised to surface area=1 for T(i)>30° C.; and
>
> T(i) is the temperature at which sample (i) is taken in a-TREF analysis, in ° C.

\* \* \* \* \*